UNITED STATES PATENT OFFICE.

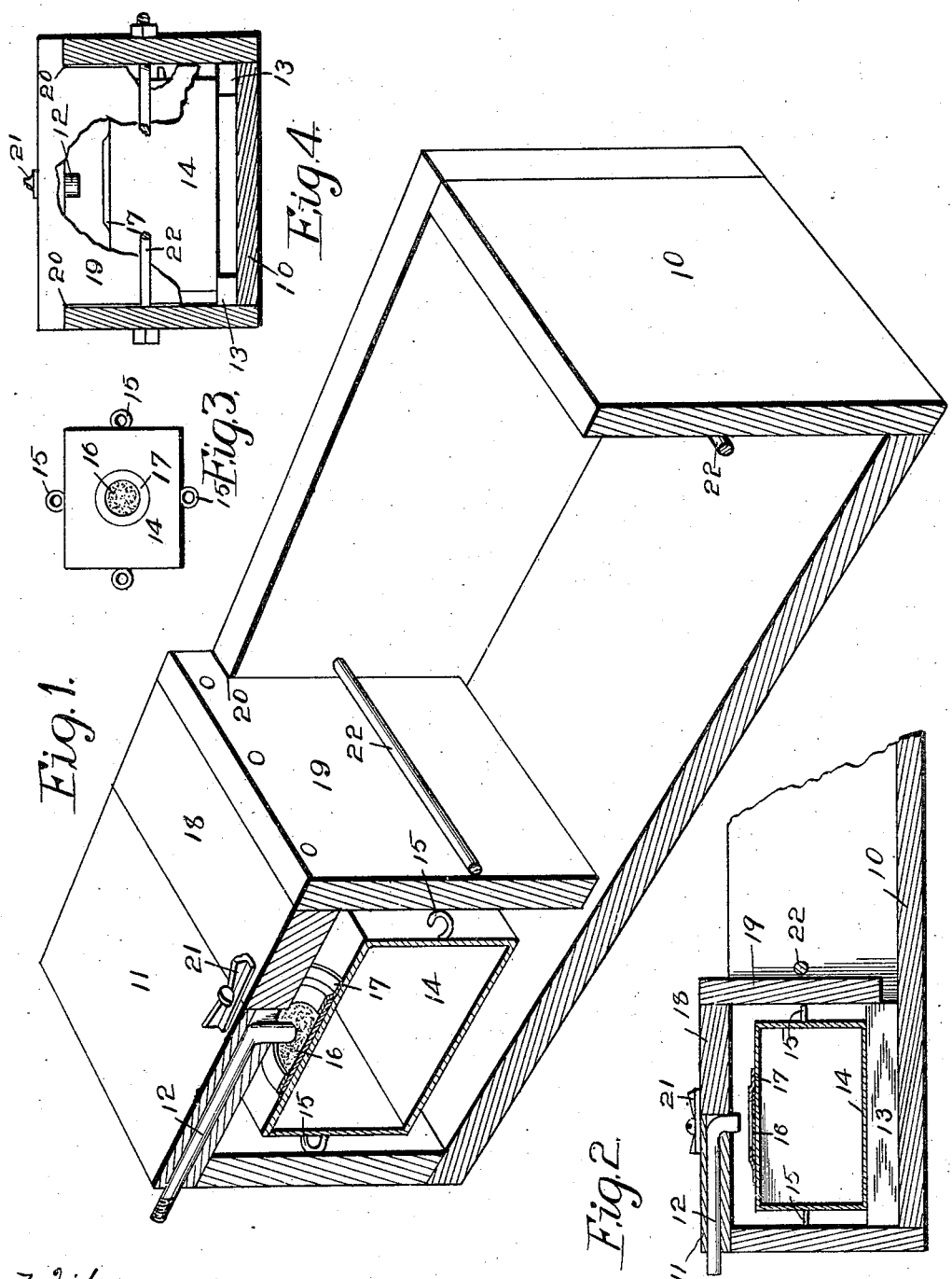

GEORGE GERTZEN, OF ALTON, AND JOHN ROGHAIR, OF ORANGE CITY, IOWA.

STOCK-WATERING TROUGH.

No. 844,277.     Specification of Letters Patent.     Patented Feb. 12, 1907.

Application filed May 14, 1906. Serial No. 316,882.

*To all whom it may concern:*

Be it known that we, GEORGE GERTZEN, a citizen of the United States, residing at Alton, in the county of Sioux and State of Iowa, and JOHN ROGHAIR, a citizen of the United States, residing at Orange City, in the county of Sioux and State of Iowa, have invented a certain new and useful Stock-Watering Trough, of which the following is a specification.

The object of our invention is to provide a stock-watering trough of simple, durable, and inexpensive construction that is not liable to get out of order and in which the operative parts of the automatic cut-off are protected against freezing and completely inclosed to protect against being tampered with, and yet access may be had to the operative parts of the valve to remove or replace them quickly and easily.

Our invention consists in the construction of the trough, whereby the objects contemplated are attained, as hereinafter more fully set forth, pointed out in our claims, and illustrated in the accompanying drawings, in which—

Figure 1 shows a longitudinal central perspective view of the complete device embodying our invention. Fig. 2 shows a vertical central sectional view of the end of the trough containing the valve mechanism. Fig. 3 shows a plan view of the float, and Fig. 4 shows a central sectional view of the trough looking toward the float with part of the detachable partition broken away.

Referring to the accompanying drawings, we have used the reference-numeral 10 to indicate the trough proper, having across one end a cover 11.

12 indicates a supply-pipe discharging downwardly below the central portion of the cover 11. Secured to the bottom of the trough, at the sides thereof under the cover 11, are two ribs 13, designed to support the float above the bottom. The float is preferably formed of a hollow rectangular sheet-metal body 14, having at each side an outwardly-projecting lug 15 with a rounded outer end and having at its top a sealing-pad 16, made of yielding material, such as rubber, which pad has its margins inclosed by a rim 17 of circular form overlapping said margins.

When the trough is empty, the edges of the float will rest upon the ribs 13, and thus be supported above the bottom of the trough, and when sufficient water has accumulated in the trough to elevate the float the pad 16 at the top thereof will engage and be firmly pressed against the discharge end of the pipe 12, thus cutting off the water-supply. The guide-lugs 15 at the sides of the float stand close to the sides and end of the trough and limit the movements of the float laterally within the trough, their rounded ends engage the sides of the trough in such a way that they will not become caught thereon, and the said lugs keep the float spaced apart from the sides of the trough far enough to permit water to freely pass around the float.

Our means for protecting the float and inclosing it comprise a cover member 18, designed to extend across the top of the trough, with its edges resting on the side edges of the tank and with one side edge engaging the cover 11. Secured to the opposite side edge of the cover 18 is the partition 19, having shoulders at 20 to rest upon the side edges of the trough and having its body portion designed to project downwardly into the trough to a point near the bottom thereof, but spaced apart from the bottom far enough to permit the passage of water. This cover and partition are held against vertical movement by means of a turn-button 21, secured to the cover 11 to project over the cover 18, and the said cover and partition device is prevented from longitudinal movement in the tank by means of a cross-bar 22, passed through the sides of the trough, to engage and limit the movement toward the center of the trough of the partition 19.

In practical use it is obvious that the parts are of very simple and inexpensive construction. The float is of such size and shape and the lugs on it are so arranged that it will not become caught or entangled in the sides of the trough, and the ribs 13 will prevent it from resting against the bottom of the trough, where it would be likely to become stuck in the mud that might accumulate thereon. When the combined cover and partition are in position, they serve to aid in guiding the float and in protecting it from being tampered with and also from freezing, because the float is completely inclosed except under the partition 19, and this passage-way is normally filled with water. The float itself is readily accessible for purposes of repair or replacement by simply turning the turn-button 21, whereupon the cover and partition may be bodily removed, and then the float may be removed without releasing any fastening devices of any kind. On account of the peculiar arrangement and combination of the parts there is only one single fastening device (the turn-button 21) that need be operated at any time to remove or replace any of the parts of the trough.

Having thus described our invention, what we claim, and desire to secure by Letters Patent of the United States therefor, is—

1. An improved stock-watering trough comprising a trough-body, a cover at one end thereof, a water-supply pipe projected downwardly through the cover, a detachable cover member resting on the top of the sides of the trough with one edge adjacent to the aforesaid cover member, a partition secured to the detachable cover member and extended downwardly to a point near the bottom of the trough, a transverse rod in the trough to limit the movement of the partition, a turn-button secured to the first-mentioned cover member to engage the other cover member and a float beneath the supply-pipe to engage and close it when the float is raised.

2. An improved stock-watering trough comprising a trough-body, a cover at one end thereof, a water-supply pipe projected downwardly through the cover, a detachable cover member resting on the top of the sides of the trough with one edge adjacent to the aforesaid cover member, a partition secured to the detachable cover member and extended downwardly to a point near the bottom of the trough, a transverse rod in the trough to limit the movement of the partition, a turn-button secured to the first-mentioned cover member to engage the other cover member, a float comprising a hollow rectangular body portion, guides with rounded heads projected outwardly from the sides thereof to stand close to the adjacent sides and end of the trough and the vertical partition, a yielding pad at the top of the float to engage the supply-pipe and supporting-ribs at the bottom of the trough to limit the downward movement of the float.

GEORGE GERTZEN.
JOHN ROGHAIR.

Witnesses:
NICOLAUS ROGHAIR,
ANTOON VAN OS.